Jan. 23, 1968     E. K. SWINK     3,364,555

SOIL PIPE ASSEMBLY DEVICE

Filed Oct. 20, 1965     2 Sheets-Sheet 1

INVENTOR.
EDWARD K. SWINK

BY *Head & Johnson*

ATTORNEYS

Jan. 23, 1968  E. K. SWINK  3,364,555
SOIL PIPE ASSEMBLY DEVICE
Filed Oct. 20, 1965  2 Sheets-Sheet 2

INVENTOR.
EDWARD K. SWINK
BY Head & Johnson
ATTORNEYS 3,364,555
SOIL PIPE ASSEMBLY DEVICE
Edward K. Swink, 1200 May Ave.,
Fort Smith, Ark. 72901
Filed Oct. 20, 1965, Ser. No. 498,752
2 Claims. (Cl. 29—237)

ABSTRACT OF THE DISCLOSURE

Pipe such as soil pipe and the like are connected to a friction sealed connector or joint by a pair of aligned chain vise members on each pipe section and which are drawn towards each other, to assemble the joint or connector, by a jacking mechanism.

---

This invention relates to holding devices, and more particularly, this invention relates to devices for holding and positioning tubular components. Still more particularly, this invention relates to devices designed for holding and forcibly assembling pipe joints.

In the assembly of pipe sections which are joined by friction joints, the forcing of the joints into close relationship requires the exertion of a great deal of force. While forcing the joints into a close connection, the pipe sections must be maintained in a proper longitudinal relationship with each other or else the joint becomes improperly assembled or assembly becomes impossible. The most common types of pipes employing friction type joints are used in sewer lines and drainage lines, and are commonly designated as soil pipes.

The primary object of this invention is to provide a device which holds and positions tubular units in relation to each other by mechanical means to make assembly and disassembly of these units more efficient and at a great saving of time and labor.

Another object of this invention is to provide a mechanical pipe joint assembly device which will accurately and speedily carry out the assembly of those pipe joints while at the same time the assembly device may be easily placed in position and quickly removed.

Still another object of this invention is to provide a mechanical pipe joint disassembly device.

Another object of this invention is to provide a mechanical assembly device to quickly and efficiently assemble pipe joints while at the same time the device itself is light weight and portable.

Further objects and advantages of the invention will become apparent from the following description and claims, taken in conjunction with the accompanying drawings wherein:

The assembly device of this invention comprises a pair of chain vise members to keep the two vise members in proper alignment. Secured to one of the chain vise members, or made an integral part of that member, is a jack member which serves to move that vise member to which it is attached along the rod. In use, the two vise members are secured to the two different sections of a pipe joint which are to be assembled. The one vise member is operated so as to bring the other pipe joint into its close fit with the first joint.

Figure 1:
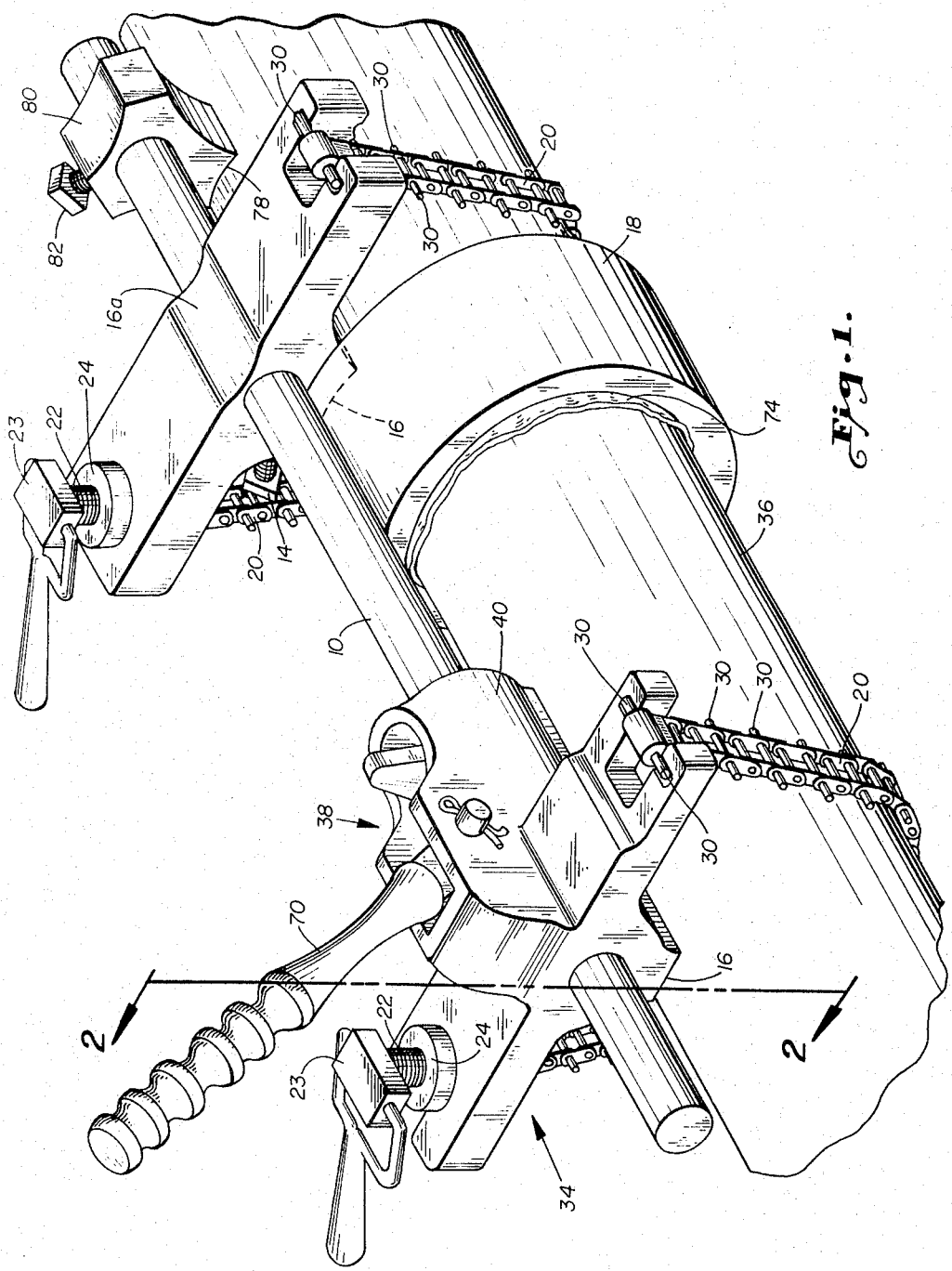
FIGURE 1 is an isometric view of the assembly device of this invention in position on a section of pipe.
Figure 2:
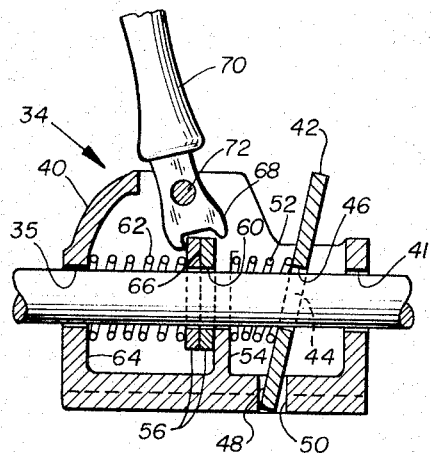
FIGURE 2 is a cross-sectional view of the assembly device of this invention along the lines 2—2 of FIGURE 1.
Figure 3:
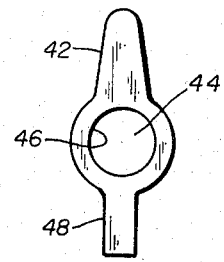
FIGURE 3 is a front elevational view of a cam washer component of the invention.
Figure 6:
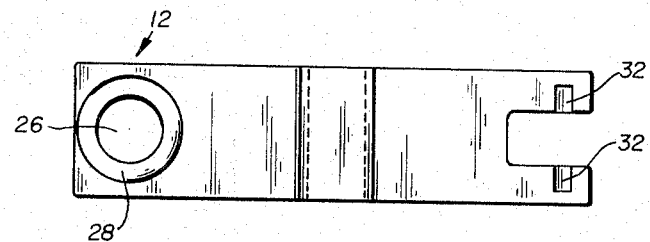
FIGURE 6 is a top elevational view of the first chain vise member of the invention of FIGURE 5.
Figure 7:
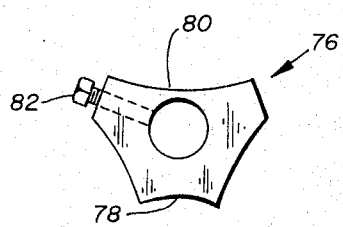
FIGURE 7 is a front elevational view of a guide member of the invention.
Figure 5:
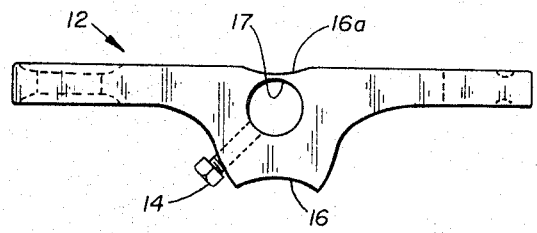
FIGURE 5 is a front elevational view of a first chain vise member of the invention.

Referring now to the figures in detail, a traveling rod 10 serves as a guide for the components of the invention. When the invention is in use, and to insure proper assembly of the pipe joints, the rod 10 is positioned longitudinally along the sections being assembled. A first chain vise member referred to generally by the numeral 12 is designed to slide along rod 10 and to be capable of being locked into its preferred position along rod 10; chain vise 12 is positioned on a pipe section by resting the concave portion 16 against the pipe surface. The concave portion 16 provides for a greater surface to be touching the pipe section and provides greater traction. Concave portion 16 contacts the surface of the soil pipe when the assembly device is positioned with chain vise member 12 behind a soil pipe collar as shown in FIGURE 1. Where desired, or made necessary because of space considerations, chain vise member 12 may be reversed with concave portion 16a resting against the concave surface of the pipe collar. Thus, with each position of member 12, traveling rod 10 is substantially parallel to the soil pipe since positioning of member 12 on the pipe collar with concave portion 16a resting against member 12 will hold rod 10 at approximately the same distance from pipe 36 as when member 12 is situated behind collar 18 with concave portion 16 resting against the pipe surface. Chain vise member 12 has a bore 17 through which rod 10 passes. After being set in position on a pipe section, as on pipe collar 18, the chain vise 12 includes a locking chain 20 which is adjustably locked around pipe collar 18. Secured to one end of chain 20 is an adjusting screw 22. Secured to screw 22 is an adjusting handle 23, which may be of conventional design, and is used for imparting rotative movement to screw 22. Adjusting screw 22 passes threadably through an adjusting lug 24 to provide means for tight adjustment of chain 20. Adjusting lug 24 slides into hole 26 and rests in countersunk portion 28. The chain 20 also includes a number of chain pins 30 protruding from each chain link, which means provide a means of coarse adjustment of the chain. Pins 30 fit into pin slot 32 on the upper surface or lower surface of the chain vise 12, and a different set of pins 30 can be chosen for each different size of pipe which the chain must hold in place. When a coarse adjustment of the chain is made by inserting a set of chain pins 30, from any portion of the chain, into slots 32, the chain is tightened around the pipe by adjustment of adjusting screw 22. A second chain vise member 34 is also slidably positioned on traveling rod 10 by reason of the passage of rod 10 through bore 35, and in the operation of the invention, chain vise 34 is secured to a second section of pipe 36 which is to be brought into close connection with pipe collar 18. Chain vise 34 is similar to chain vise 12 in that chain vise 34 includes a concave portion 16 for positioning against a pipe section, a locking chain 20 for securing a second section of pipe, an adjusting screw 22, an adjusting lug 24, and chain pins 30. A jack member 38 is secured to second chain vise 34 either by conventional means or being made integral with chain vise 34. Jack member 38 serves the purpose of moving pipe section 36, to which chain vise 34 is secured, into relationship with the pipe collar 18 to which chain vise 12 is secured. FIGURE 1 describes a jack member 38 which is made integral with second chain vise 34, and FIGURE 2 is a cross-sectional view of jack member 38 describing the manner in which the interior parts cooperate. Jack member 38 includes a jack housing 40 which serves as a frame or holding component for the actuating parts and which housing has a bore 41 to receive rod 10. Located inside the housing is a first cam washer 42 shown in cross-section in FIGURE 2 and in elevational view in FIGURE 3. First cam washer 42 has a central opening formed by wall portion 46, and a protrusion portion 48 which extends through a slot 50 in jack housing 40 when the cam washer is in position. When in position inside jack housing 40, cam washer 42 is maintained in a normally canted position towards that end of the jack housing which contains bore 41 by means of a first coil spring 52 which is maintained in its position by being supported at one end by a wall portion 54. In this canted position cam washer 42 tends to restrict the movement by reason of the sharp upper and lower edges of wall portion 46 being in edge-like contact with rod 10. Then when cam washer 42 is brought into a more nearly perpendicular position with regard to rod 10 by means of movement of the exterior portion of cam washer 42 towards spring 52, the edge-like surfaces of wall portion 46 are no longer in restrictive contact with rod 10 and cam washer 42 moves freely along rod 10.

Figure 4:
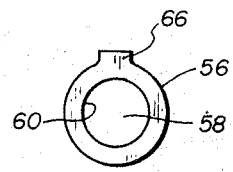
FIGURE 4 is a front elevational view of a second cam washer component of the invention.

Interior of jack housing 40 and positioned on the opposite side of wall portion 54 from coil spring 52 are two smaller cam washers 56 shown in cross-section in FIGURE 2 and in front elevational view in FIGURE 4. These cam washers are identical and each include a bore 58 formed by wall portions 60, which bore is sufficiently large to permit the cam washers to slide freely along rod 10 when cam washers 56 are at least approximately perpendicular to rod 10. Cam washers 56 are forced into a normally approximately perpendicular position with respect to rod 10 by means of second coil spring 62 which is compressed into position between cam washers 56 and wall 64. Each cam washer 56 has a tab portion 66 which provides means by which a tongue portion 68 of a lever 70 may act upon cam washers 56 to move these cam washers into and out of a vertical position with respect to rod 10.

Lever 70 is swivelably attached to jack housing 40 by means of pin 72. Lever 70 acts upon cam washers 56 to cause these cam washers to be moved from their normally substantially perpendicular position with respect to rod 10 to a canted position against the force of spring 62 so that edge portions of the walls 60 will be in edge-like contact with rod 10 and present a clamping effect to rod 10. Thus, cam washers 56 can be moved alternately from a perpendicular position to a canted position.

When second chain vise member 34 is attached to jack member 38 and these are in proper position on a pipe section, rod 10 passes through bore 41, central opening 44, coil spring 52, cam washer bore 58, coil spring 62 and bore 35. In its normally canted position toward bore 41, assuming that direction to be a first direction, cam washer 42 permits the movement of jack member 38 in that first direction, and restricts movement of jack member 38 in the opposite or second direction. Also, when properly mounted, and before operation of lever 70, cam washers 56 are in a position to permit movement in either direction. Thus, when cam washer 42 is compressed against coil spring 52, jack member 38 is free to move in either direction.

When lever 70 is moved swivelably toward front bore 41 tongue portion 68 acts upon cam washers 56 to cant these cam washers. If lever 70 and these cam washers 56 are held in this canted position, this tends to restrict the movement of jack member 38 in either direction. Then, when lever 70 is returned to its normal position, coil spring 52 acts upon cam washer 42, and coil spring 62 acts upon cam washers 56 and wall portion 64 to provide a slight movement in the aforesaid first direction of jack member 38. Thus, with each movement of lever 70, a small movement of jack member 38 and chain vise member 34 along rod 10 is accomplished.

When chain vise member 34 and jack member 38 are positioned so that the previously mentioned first direction is towards a pipe collar or second section of pipe, such as shown in FIGURE 1, the device of this invention is used to force two sections of pipe joint into an assembled position. For example, as shown in FIGURE 1, the device of this invention is used in forcing pipe section 36 into a sealing arrangement with a pipe collar 18 with sealing material forced between section 36 and collar 18. The sealing material is conventional, such as a neoprene gasket 74.

Guide member 76 is slidably received on rod 10 as shown in FIGURE 1 so that chain vise member 12 is between guide member 76 and jack member 38. Guide member 76 assists in keeping chain vise member 12, chain vise member 34, and jack member 38 in proper alignment for the most efficient operation. When chain vise member 12 is positioned on the pipe coller 18 with concave portion 16a resting on the collar surface, guide member 76 is positioned against the pipe surface. Should rod 10 be closer to the pipe surface than this position of member 76 permits, then member 76 can be reversed so that concave portion 80 rests against the pipe surface. Guide member 76 is secured in position along rod 10 by means of a set screw 82.

The invention may also be used to pull apart pipe sections which have previously been assembled. For use in this manner, first chain vise member 12 is secured to a first section of pipe, and second chain vise member 34 along with jack member 38 is secured to a second joint of pipe and the device is operated as set out heretofore, except that the movement of force of jack member 38 will be away from chain vise 12, that is the direction of operation will be facing away from chain vise 12. Thus, in this use, easy and rapid disassembly of sealed pipe joints may be accomplished.

Since many different embodiments of this invention may be made without departing from the spirit and scope thereof, it is to be understood that the specific embodiment described in detail herein is not to be taken in a limiting sense, since the scope of this invention is best defined by the appended claims.

What is claimed:
1. Apparatus for moving two sections of pipe axially into or out of a common collar comprising;
    a one-piece continuous aligned traveling rod,
    a guide member slidably and securably positionable on said rod to cause said rod to align substantially parallel to the axis of said pipe,
    a first chain vise member slidably and securably positionable on said rod, said vise portion including a transverse frame portion and an adjustable chain pipe clamping means capable of encircling one of said pipe sections,
    a jack member including a transverse frame portion capable of abutably positioning against the other section of pipe yet slidably positionable on said traveling rod, said jack member including jack means to actuate a frictional lock and slide member against said traveling rod to cause said jack member to move along said rod, whereby said pipe sections, upon actuation of said jack member, move either in a direction toward each other into said common collar or move in a second manner away from each other out of said common collar.

2. Apparatus according to claim 1 wherein said jack member and transverse frame portion include an adjustable pipe holding means of the chain vise type capable of encircling said other section of pipe and being retained thereto.

References Cited

UNITED STATES PATENTS

| 2,670,174 | 2/1954 | Lucker. | |
| 2,691,211 | 10/1954 | Leiber | 29—237 |
| 3,182,388 | 5/1965 | Hart et al. | |

FOREIGN PATENTS 1,146,247  3/1963  Germany.

OTHELL M. SIMPSON, *Primary Examiner.*

WILLIAM FELDMAN, *Examiner.*

J. C. PETERS, *Assistant Examiner.*